United States Patent
Takano

(10) Patent No.: US 8,854,541 B2
(45) Date of Patent: Oct. 7, 2014

(54) VIDEO DEMODULATION DEVICE

(71) Applicant: Panasonic Corporation, Osaka (JP)

(72) Inventor: Haruka Takano, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 14/206,833

(22) Filed: Mar. 12, 2014

(65) Prior Publication Data

US 2014/0192262 A1    Jul. 10, 2014

Related U.S. Application Data

(63) Continuation of application No. PCT/JP2012/001797, filed on Mar. 14, 2012.

(30) Foreign Application Priority Data

Sep. 27, 2011  (JP) ................... 2011-210240

(51) Int. Cl.
| | |
|---|---|
| *H04N 5/00* | (2011.01) |
| *H04N 5/10* | (2006.01) |
| *H04N 5/57* | (2006.01) |
| *H04N 9/77* | (2006.01) |
| *H04N 5/455* | (2006.01) |
| *H04N 5/213* | (2006.01) |
| *H04N 5/08* | (2006.01) |

(52) U.S. Cl.
CPC .............. *H04N 5/213* (2013.01); *H04N 5/57* (2013.01); *H04N 5/455* (2013.01); *H04N 5/08* (2013.01)
USPC ........... 348/470; 348/607; 348/531; 348/726; 348/712; 348/687

(58) Field of Classification Search
USPC ........... 348/447, 497, 607, 621, 53, 540, 678, 348/712, 725, 726
See application file for complete search history.

(56) References Cited

U.S. PATENT DOCUMENTS 5,943,101 A * 8/1999 Hirtz et al. .................... 348/604
7,362,382 B2 * 4/2008 Akiyama ...................... 348/678

(Continued)

FOREIGN PATENT DOCUMENTS

| JP | 61-075678 U | 5/1986 |
|---|---|---|
| JP | 2002-300425 A | 10/2002 |

(Continued)

OTHER PUBLICATIONS

International Search Report issued in International Application No. PCT/JP2012/001797 mailed Jun. 19, 2012, with English translation, 5 pgs.

*Primary Examiner* — Brian Yenke

(74) *Attorney, Agent, or Firm* — McDermott Will & Emery LLP

(57) ABSTRACT

A demodulator of a video demodulation device includes an analog-to-digital converter converting an analog IF signal into a digital IF signal, a luminance gain adjuster performing gain adjustment of a luminance component included in the digital IF signal such that a maximum of the luminance component within a predetermined period becomes equal to a predetermined reference value, and a synchronization corrector receiving as input a result of the gain adjustment, correcting a signal corresponding to a signaling period of the horizontal synchronizing signal, and outputting the signal as a CVBS signal. The synchronization corrector outputs, as the CVBS signal, a composite signal containing the luminance component and a color component included in the gain adjustment result when the composite signal is smaller than the reference value, or the reference value when the composite signal is equal to or greater than the reference value.

8 Claims, 12 Drawing Sheets

(56) References Cited

U.S. PATENT DOCUMENTS

| | | | |
|---|---|---|---|
| 7,701,512 B1* | 4/2010 | Woodall et al. | 348/526 |
| 7,710,500 B2* | 5/2010 | Byeon et al. | 348/521 |
| 8,078,127 B2* | 12/2011 | Minamino et al. | 455/234.1 |
| 8,212,941 B2* | 7/2012 | Liou et al. | 348/726 |
| 8,564,722 B2* | 10/2013 | Yang | 348/531 |
| 2005/0174487 A1* | 8/2005 | O'Connell | 348/525 |
| 2005/0185100 A1* | 8/2005 | Akiyama | 348/678 |
| 2005/0280738 A1* | 12/2005 | Cha | 348/525 |
| 2006/0170821 A1 | 8/2006 | Lim et al. | |
| 2006/0203128 A1* | 9/2006 | Sasahara et al. | 348/682 |
| 2007/0019112 A1* | 1/2007 | Kim | 348/646 |
| 2009/0027553 A1* | 1/2009 | Park | 348/528 |
| 2009/0273714 A1* | 11/2009 | Liou et al. | 348/572 |
| 2010/0181691 A1* | 7/2010 | Yoshida | 264/1.36 |
| 2010/0328544 A1* | 12/2010 | Hendrickson et al. | 348/726 |
| 2011/0249185 A1* | 10/2011 | Elsherif et al. | 348/572 |

FOREIGN PATENT DOCUMENTS

| | | |
|---|---|---|
| JP | 2004-266710 A | 9/2004 |
| JP | 2006-060491 A | 3/2006 |
| JP | 2006-180501 A | 7/2006 |

* cited by examiner

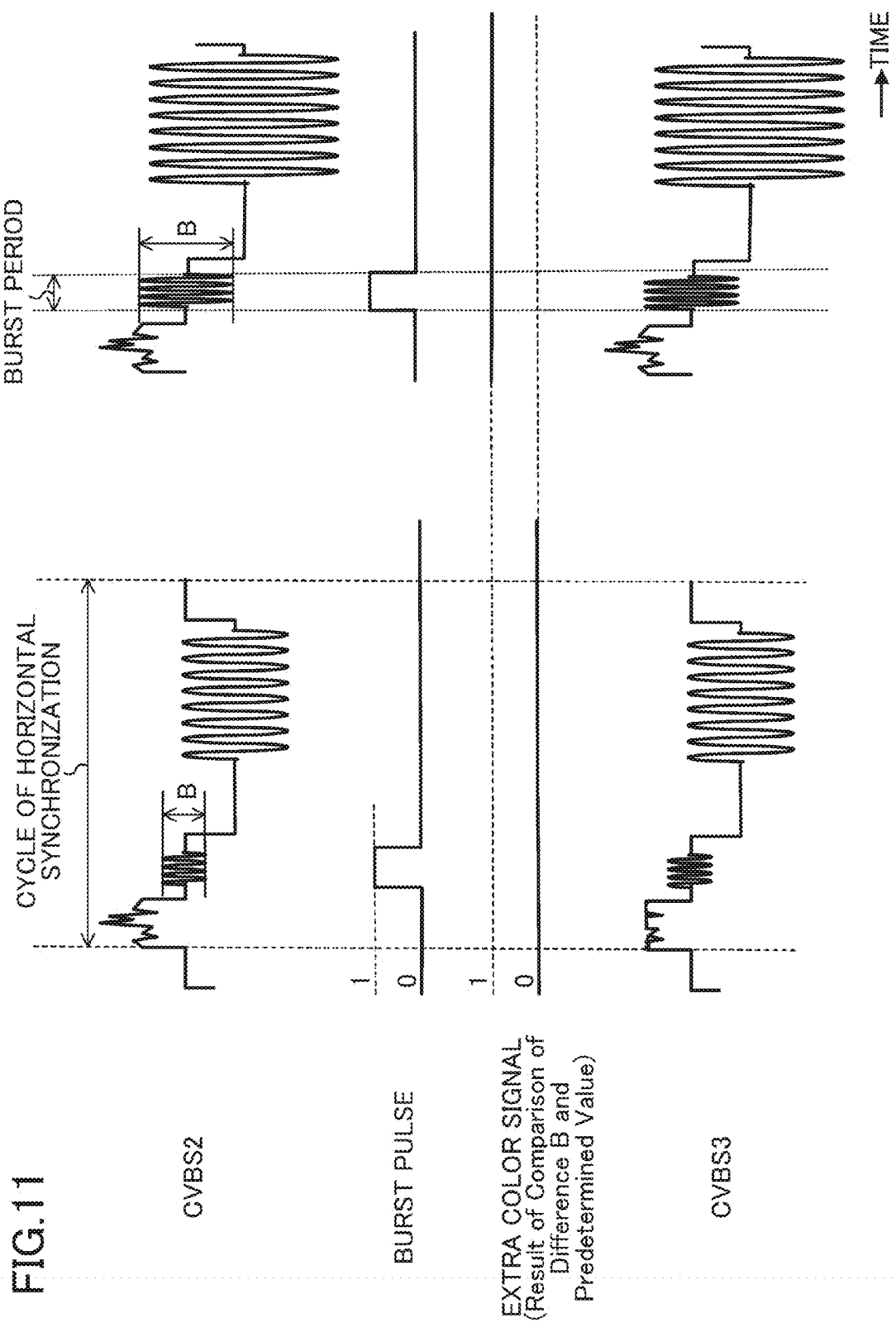

VIDEO DEMODULATION DEVICE

CROSS-REFERENCE TO RELATED APPLICATIONS

This is a continuation of International Application No. PCT/JP2012/001797 filed on Mar. 14, 2012, which claims priority to Japanese Patent Application No. 2011-210240 filed on Sep. 27, 2011. The entire disclosures of these applications are incorporated by reference herein.

BACKGROUND

The present disclosure relates to video demodulation devices which have a function of demodulating or reproducing a composite video, blanking, and sync signal (a CVBS signal) by digital processing, and which, in particular, are capable of outputting the CVBS signal. More specifically, the present disclosure relates to a technique for preventing lateral blurring of video reproduced from a CVBS signal by achieving stable horizontal synchronization by reducing a noise component included in a horizontal synchronizing signal of the CVBS signal reproduced through demodulation processing in analog telecasting.

Recently, increases in performance and image quality and decreases in costs of video demodulation devices for TV sets have leaded to growing trend toward digitalization of demodulation processing and image processing in analog telecasting.

In demodulation processing of an analog telecasting signal with interference, a low-quality CVBS signal is reproduced, and accordingly, out-of-horizontal-synchronization occurs multiple times in the later video processing, thereby causing lateral blurring of the video. In particular, when an inexpensive tuner is used, a low-quality CVBS signal is likely to be reproduced. Under these circumstances, more importance is placed on digital demodulation devices capable of reproducing a high-quality CVBS signal at reduced costs.

It is known that a noise component included in a horizontal synchronizing signal is a main factor causing the out-of-horizontal-synchronization which results in the lateral blurring of video.

For example, in Japanese Utility Model Publication No. S61-75678, in reproduction of a CVBS signal recorded on a video tape, a pedestal voltage of the input CVBS signal is measured, and a basic voltage of a horizontal synchronizing signal is calculated by subtracting a predetermined value from the measured pedestal voltage. Only during a signaling period of the horizontal synchronizing signal, the basic voltage substituting for the CVBS signal is output, thereby removing a noise component from the horizontal synchronizing signal.

Japanese Unexamined Patent Publication No. 2006-180501 describes a technique related to a video processing device to which a demodulated or reproduced CVBS signal is input. According to this technique, when horizontal synchronization is detected, the input CVBS signal is subjected to noise removal with use of a filter and sliced at a predetermined value, thereby preventing out-of-horizontal-synchronization even when interference occurs.

SUMMARY

According to the method described in Japanese Utility Model Publication No. S61-75678, to reduce lateral blurring of video by removing the noise component from the horizontal synchronizing signal of the CVBS signal, the voltage of the horizontal synchronizing signal is replaced with the voltage calculated by subtracting the predetermined value from the pedestal voltage. However, this method has the following disadvantages. If the pedestal voltage is incorrect, the voltage of the horizontal synchronizing signal is also replaced with an incorrect voltage. Further, if the position of the horizontal synchronizing signal is incorrectly determined, the replacement of the voltage of the horizontal synchronizing signal takes place within a video period for example, and the information of video to be displayed is destroyed. In addition, it is more likely that the value of the pedestal voltage and the position of the horizontal synchronizing signal are incorrectly determined when interference occurs. Accordingly, when reproducing a CBVS signal with interference, this method adversely causes degradation of the quality of the CVBS signal.

According to the technique of Japanese Unexamined Patent Publication No. 2006-180501, the noise component is removed from the input CVBS signal including the horizontal synchronizing signal by means of the filter, and thereby reducing occurrence of out-of-horizontal-synchronization even when interference occurs. In general, the configuration as described in this patent document must include clamp circuits (i.e., circuits for adjusting a DC component) provided upstream and downstream of an analog-to-digital converter. The DC component adjustment performed by the clamp circuits is considerably affected by a noise component included in a horizontal synchronizing signal. Accordingly, the noise component disadvantageously destabilizes the DC component of the CVBS signal to be input, thereby making it difficult to achieve stable horizontal synchronization.

It is therefore an object of the present disclosure to effectively remove a noise component included in a horizontal synchronizing signal and causing lateral blurring of video from a CVBS signal even when the CVBS signal is a low-quality signal.

To achieve the object, according to a first aspect of the present disclosure, a video demodulation device configured to demodulate an RF signal resulting from analog modulation of a composite video, blanking, and sync signal (a CVBS signal) including a horizontal synchronizing signal and to reproduce the CVBS signal by digital processing includes: a tuner configured to receive as input the RF signal resulting from analog modulation, and to output an analog IF signal; and a demodulator configured to receive as input the analog IF signal, and to demodulate the CVBS signal, wherein the demodulator includes an analog-to-digital converter configured to convert the analog IF signal into a digital IF signal, a luminance gain adjuster configured to perform gain adjustment of a luminance component included in the digital IF signal such that a maximum of the luminance component found within a predetermined period becomes equal to a predetermined reference value, and a synchronization corrector configured to receive as input a result of the gain adjustment, to correct a signal corresponding to a signaling period of the horizontal synchronizing signal, and to output the corrected signal as the CVBS signal, and the synchronization corrector outputs, as the CVBS signal, a composite signal containing the luminance component and a color component included in the gain adjustment result when the composite signal is smaller than the reference value, or the reference value when the composite signal is equal to or greater than the reference value. This configuration enables removal of a noise component from a horizontal synchronizing signal of a low-quality CVBS signal of which horizontal synchronization cannot be established and a pedestal level cannot be determined.

According to a second aspect of the present disclosure, a video demodulation device configured to demodulate an RF signal resulting from analog modulation of a composite video, blanking, and sync signal (a CVBS signal) including a horizontal synchronizing signal and to reproduce the CVBS signal by digital processing includes: a tuner configured to receive as input the RF signal resulting from analog modulation, and to output an analog IF signal; a demodulator configured to receive as input the analog IF signal, and to demodulate the CVBS signal, and a video processor configured to receive as input the demodulated CVBS signal, and to output a video signal by performing required processing, wherein the demodulator includes an analog-to-digital converter configured to convert the analog IF signal into a digital IF signal, an automatic phase controller configured to control and set a phase offset of a luminance component of the CVBS signal included in the digital IF signal to 0, and to output the digital IF signal as an audio/video signal, a filter configured to separate the audio/video signal into the luminance component, a color component, and an audio component, and to output the luminance component and the color component as a first CVBS signal, a luminance gain adjuster configured to perform gain adjustment of the luminance component included in the first CVBS signal such that a maximum of the luminance component found within a predetermined period becomes equal to a predetermined reference value, and to output the first CVBS signal as a second CVBS signal, a synchronization corrector configured to receive as input the second CVBS signal, to correct a signal corresponding to a signaling period of the horizontal synchronizing signal, and to output the second CVBS signal as a third CVBS signal, a clamp circuit configured to perform polarity inversion of the third CVBS signal, to adjust the third CVBS signal so as to be at a predetermined DC level, and to output the third CVBS signal as the CVBS signal, and a digital-to-analog converter configured to convert the CVBS signal having been input from the clamp circuit into an analog signal, and to output the analog signal to the video processor, and the synchronization corrector outputs, as the third CVBS signal, the second CVBS signal when the second CVBS signal is smaller than the reference value, or the reference value when the second CVBS signal is equal to or greater than the reference value. This configuration enables removal of a noise component from a horizontal synchronizing signal of a low-quality CVBS signal of which horizontal synchronization cannot be established and a pedestal level is instable or cannot be detected.

According to the present disclosure, it is possible to achieve, with a simple circuit, a video demodulation device which can accurately correct a horizontal synchronizing signal and reduce fluctuations of a DC component of a clamp circuit even under inferior signal-receiving conditions in which a position of horizontal synchronization is unclear. According to the present disclosure, the video demodulation device that reduces lateral blurring of video even under inferior signal-receiving conditions can be produced at low costs. In contrast to video demodulation devices performing demodulation with analog processing and providing less accurate demodulation, the present disclosure can provide highly accurate demodulation at low costs.

BRIEF DESCRIPTION OF THE DRAWINGS

FIG. 11 is a timing chart showing operation by the synchronization corrector of FIG. 10.

FIG. 12A shows an image example according to a conventional technique and with severe lateral blurring whereas

DETAILED DESCRIPTION

Embodiments of the present disclosure will be described below in detail with reference to the drawings.

<<First Embodiment>>

Figure 1:
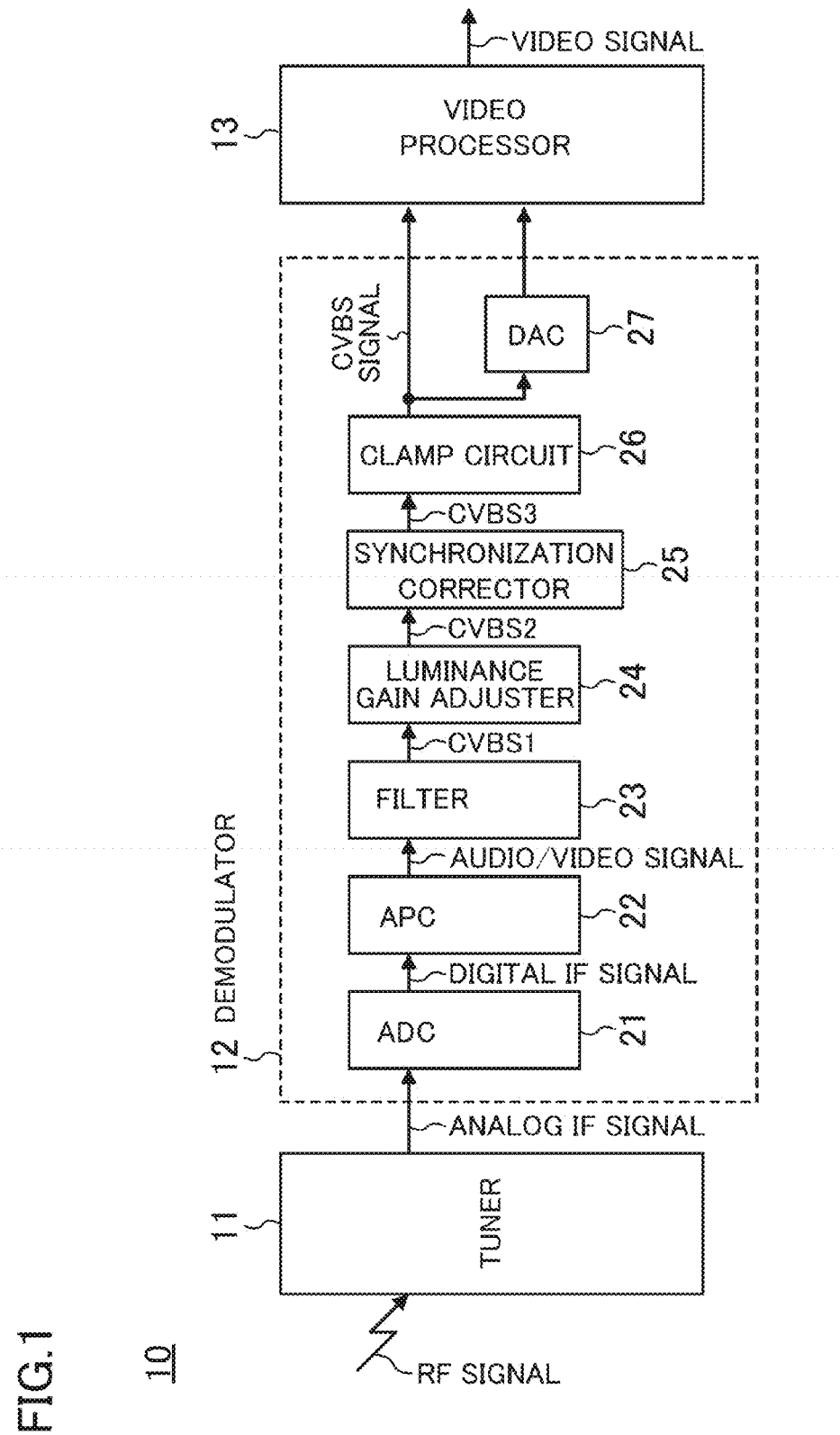
FIG. 1 is a block diagram illustrating a configuration of a video demodulation device according to a first embodiment of the present disclosure.

FIG. 1 illustrates a configuration of a video demodulation device according to a first embodiment of the present disclosure. The video demodulation device 10 of FIG. 1 includes a tuner 11, a demodulator 12, and a video processor 13. The demodulator 12 includes an analog-to-digital converter (ADC) 21, an automatic phase controller (APC) 22, a filter 23, a luminance gain adjuster 24, a synchronization corrector 25, a clamp circuit 26, and a digital-to-analog converter (DAC) 27.

The tuner 11 receives as input an RF signal resulting from analog modulation, such as negative modulation according to National Television System Committee (NTSC), of a CVBS signal, and down-converts the RF signal to output an analog IF signal. The demodulator 12 receives as input the analog IF signal, performs demodulation of the CVBS signal, and outputs the demodulated CVBS signal. The video processor 13 receives as input the CVBS signal, and performs Y/C separation and matrix processing to output a video signal.

Figure 2:
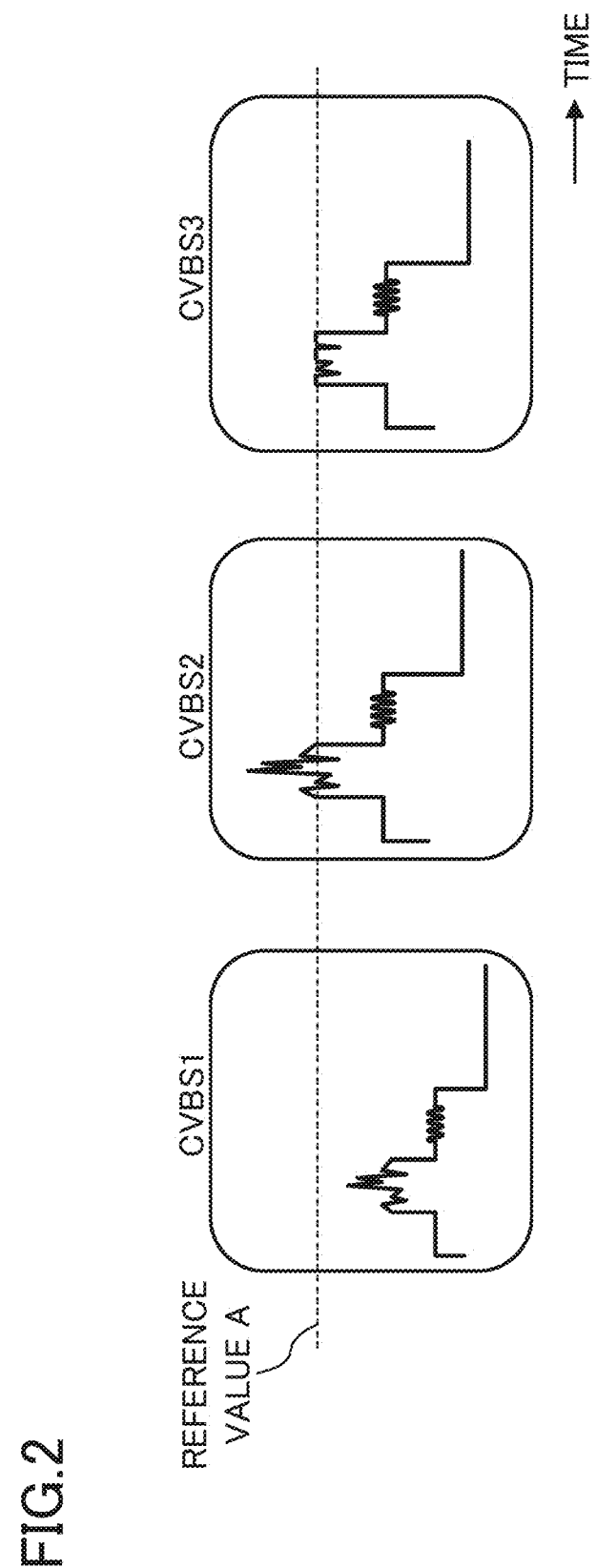
FIG. 2 is a timing chart showing operation by the luminance gain adjuster and the synchronization corrector of FIG. 1.

FIG. 2 shows operation by the luminance gain adjuster 24 and the synchronization corrector 25 of FIG. 1. Specifically, FIG. 2 schematically shows a flow of the signal processing from input to the luminance gain adjuster 24 to output from the synchronization corrector 25 in the demodulator 12.

The ADC 21 converts the input analog IF signal into a digital IF signal, and outputs the digital IF signal. The APC 22 receives as input the digital IF signal, controls and sets a phase offset of a luminance component of the CVBS signal included in the digital IF signal to 0, and then, outputs the digital IF signal as an audio/video signal. The filter 23 separates the audio/video signal into the luminance component, a color component, and an audio component, and outputs the luminance component and the color component as a first CVBS signal (CVBS1). That is, the first CVBS signal (CVBS1) is a composite signal including the luminance and color components. The luminance gain adjuster 24 performs gain adjustment of the first CVBS signal (CVBS1) such that a maximum of the luminance component of the first CVBS signal (CVBS1) becomes equal to a predetermined reference value A, and then, outputs the first CVBS signal as a second CVBS signal (CVBS2). The synchronization corrector 25 receives as input the second CVBS signal (CVBS2), corrects a signal corresponding to a signaling period of a horizontal synchronizing signal, and then, outputs the second CVBS signal as a third CVBS signal (CVBS3). The clamp circuit 26 performs polarity inversion of the third CVBS signal (CVBS3) input thereto, adjusts the third CVBS signal (CVBS3) so as to be at a predetermined DC level, and outputs the third CVBS signal as the CVBS signal. The DAC 27 converts the CVBS signal into an analog signal and outputs the analog signal.

Figure 3:
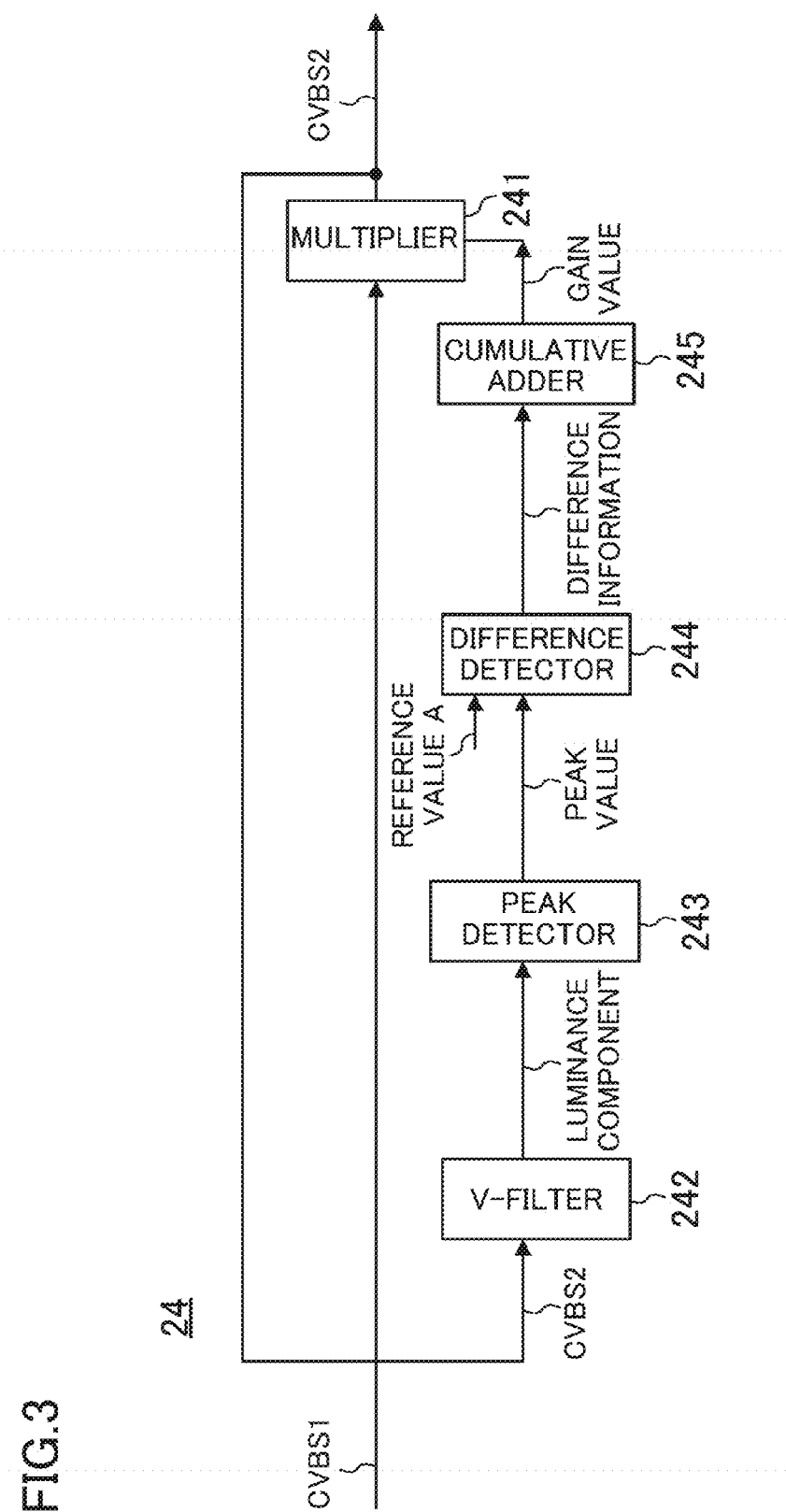
FIG. 3 is a block diagram illustrating in detail a configuration example of the luminance gain adjuster of FIG. 1.
Figure 4:
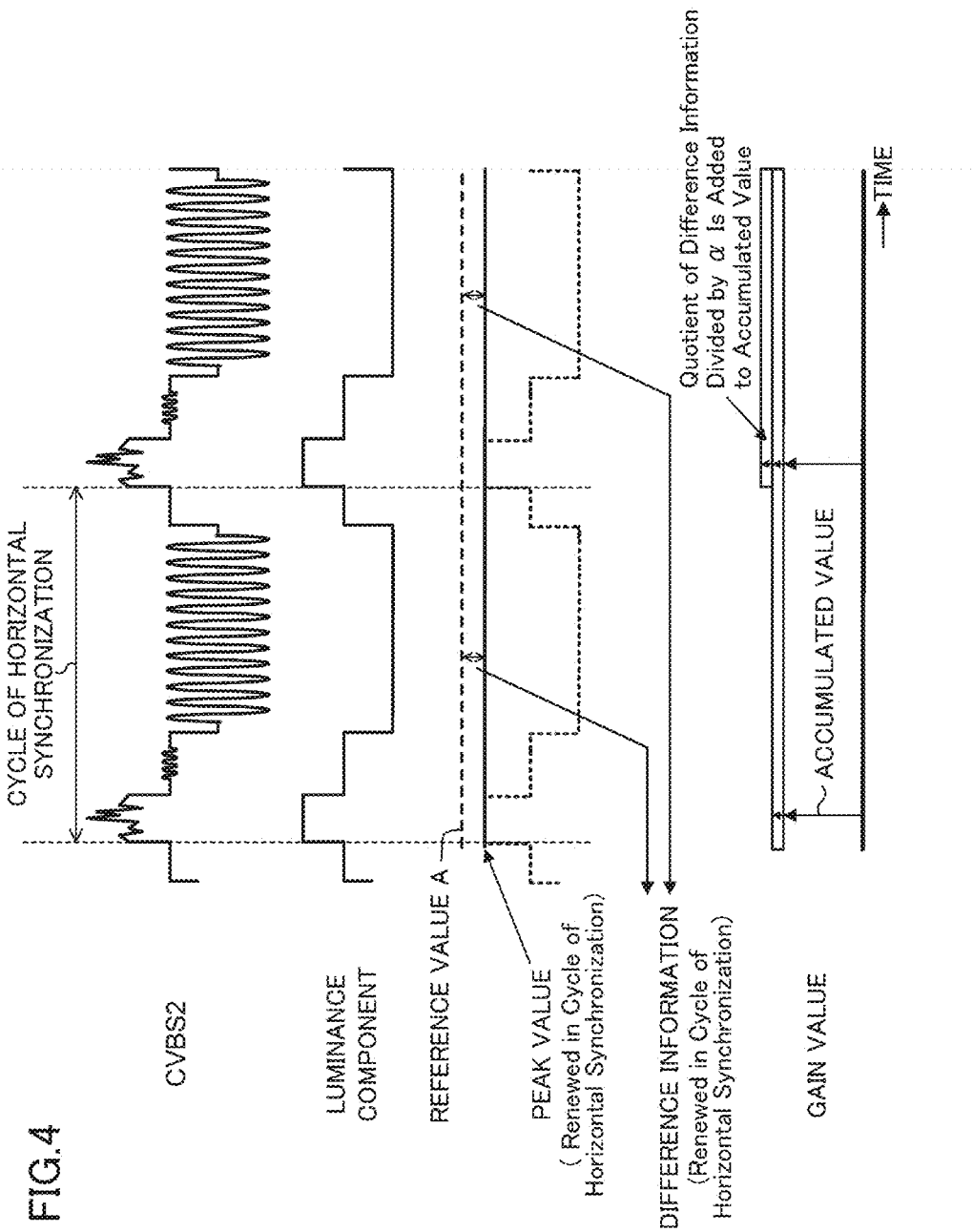
FIG. 4 is a timing chart showing operation by the luminance gain adjuster of FIG. 3.

FIG. 3 illustrates in detail a configuration example of the luminance gain adjuster 24 of FIG. 1, and FIG. 4 shows operation by the luminance gain adjuster 24 of FIG. 3. The luminance gain adjuster 24 includes a multiplier 241, a V-filter 242, a peak detector 243, a difference detector 244, and a cumulative adder 245.

The multiplier 241 of the luminance gain adjuster 24 receives as input the first CVBS signal and a gain value, and outputs the product of multiplying the first CVBS signal by the gain value as the second CVBS signal (CVBS2). The V-filter 242 which is made of a filter having a pass-band of about 300 kHz removes the color component and a noise component from the second CVBS signal (CVBS2), and outputs the luminance component. The peak detector 243 detects the maximum of the input luminance component within a cycle of the horizontal synchronizing signal, renews the maximum in every cycle, and outputs the renewed maximum as a peak value. The difference detector 244 calculates a difference between the peak value and the reference value A which can be set as desired, and outputs the difference as difference information. The cumulative adder 245 performs smoothing by adding to an accumulated value the quotient of the difference information divided by a which is a constant, and outputs the smoothed value as the gain value to the multiplier 241. The initial value of the accumulated value is set to 1.000, for example. The gain value converges to a value at which the reference value A and the peak value become equal to each other.

Figure 5:
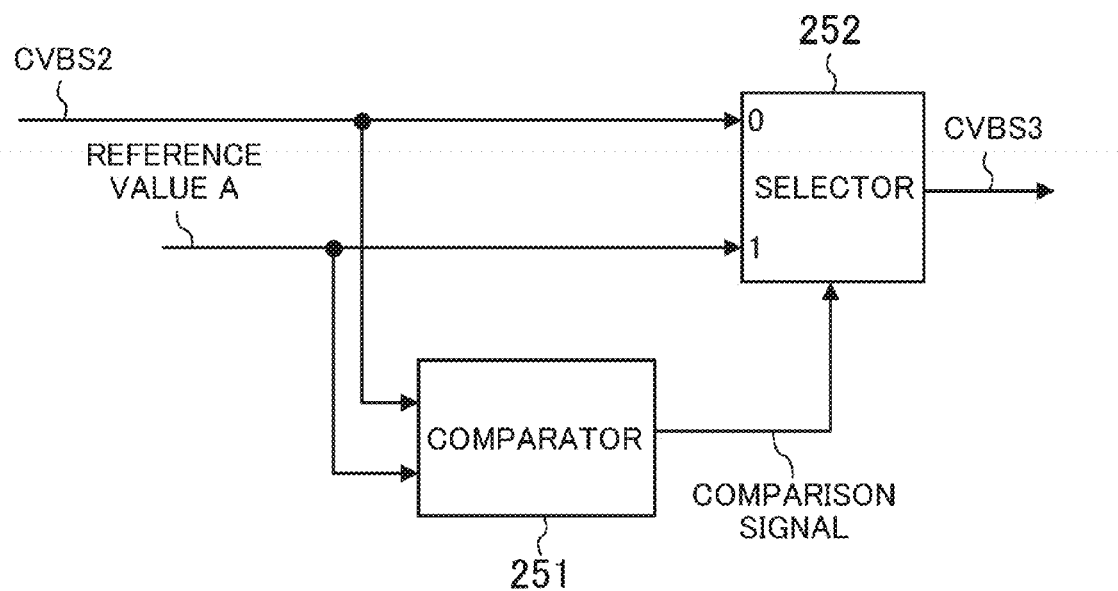
FIG. 5 is a block diagram illustrating in detail a configuration example of the synchronization corrector of FIG. 1
Figure 6:
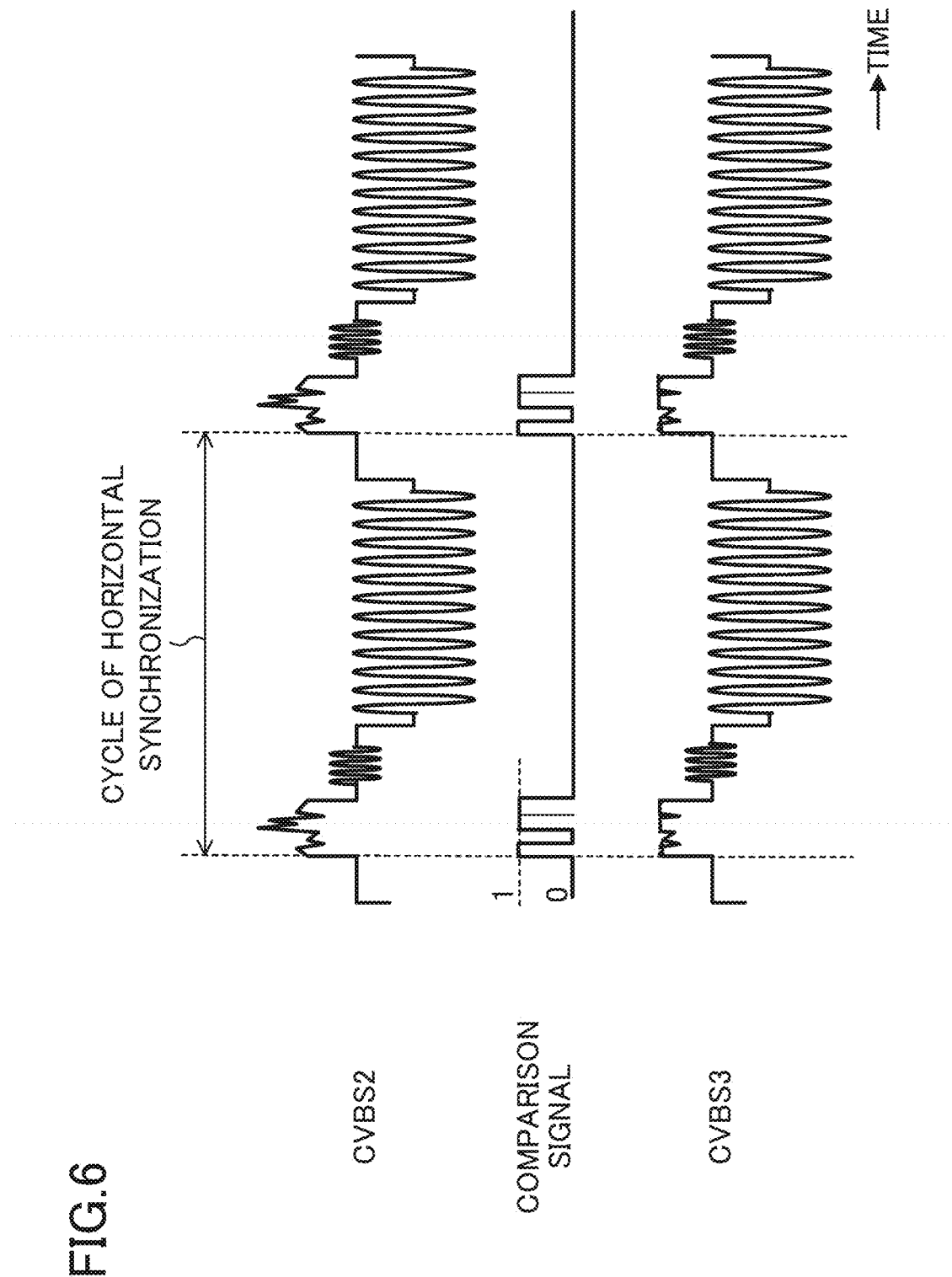
FIG. 6 is a timing chart showing operation by the synchronization corrector of FIG. 5.

FIG. 5 illustrates in detail a configuration example of the synchronization corrector 25 of FIG. 1, and FIG. 6 shows operation by the synchronization corrector 25 of FIG. 5. The synchronization corrector 25 includes a comparator 251 and a selector 252.

The comparator 251 of the synchronization corrector 25 receives, as input, the second CVBS signal (CVBS2) and the reference value A. The comparator 251 of the synchronization corrector 25 outputs, as a comparison signal, 1 when the second CVBS signal (CVBS2) is equal to or greater than the reference value A, or 0 when the second CVBS signal (CVBS2) is smaller than the reference value A. The selector 252 outputs, as the third CVBS signal (CVBS3), the reference value A when the comparison signal is 1, or the second CVBS signal (CVBS2) when the comparison signal is 0.

Here, the luminance gain adjuster 24 outputs the second CVBS signal (CVBS2) after performing gain adjustment of the first CVBS signal (CVBS1) such that the maximum of the luminance component of the second CVBS signal (CVBS2) becomes equal to the reference value A. Accordingly, letting (1) be the maximum of the luminance component of CVBS2, and letting (2) be the reference value A, (1) is equal to (2). In general, in demodulation of a negative modulation signal of a CVBS signal, a noise component is the only signal that is greater than a horizontal synchronizing signal at this processing stage, and the horizontal synchronizing signal includes the luminance component only. Accordingly, letting (1) be the maximum of the luminance component of CVBS2, and letting (3) be the value of the horizontal synchronizing signal of CVBS2, (1) is equal to (3). Thus, (2) is also equal to (3).

Consequently, by causing the synchronization corrector 25 to output the reference value A when the input second CVBS signal (CVBS2) is equal to or greater than the reference A, the noise component can be effectively removed from the horizontal synchronizing signal.

Thus, according to the first embodiment of the present disclosure, even when a low-quality signal of which the position of a horizontal synchronizing signal is inaccurately determined is received, a noise component can be accurately removed from the horizontal synchronizing signal. In addition, since the luminance gain adjuster 24 operates such that the maximum of the luminance component of the second CVBS signal (CVBS2) is constantly equal to the reference value A, almost no error exists between the magnitude which the horizontal synchronizing signal of the second CVBS signal (CVBS2) is supposed to have and the reference value A. Therefore, even when a low-quality signal is received, it is possible to achieve stable horizontal synchronization while reducing lateral blurring of video by accurately correcting the horizontal synchronizing signal.

Figure 7:
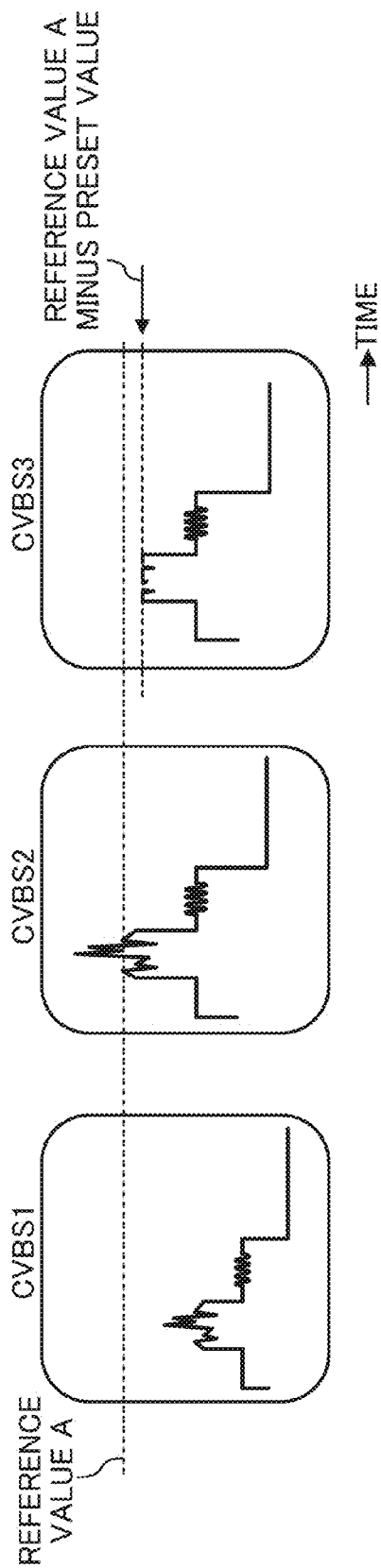
FIG. 7 is a timing chart showing another operation by the luminance gain adjuster and the synchronization corrector of FIG. 1.

In the above description of operation by the video demodulation device 10, the case where the RF signal analog-modulated by negative modulation is input has been exemplified. The present disclosure, however, is not limited to the video demodulation device 10 that receives with an antenna the RF analog-modulated signal by negative modulation. Further, the synchronization corrector 25 and the luminance gain adjuster 24 do not necessarily have to use the exactly same reference value A, and the reference value A may be adjusted according to increase or decrease in a preset value, as illustrated in FIG. 7. In this manner, it is possible to change the intensity of noise component removal. For the sake of conciseness, it has been described in a quantitative manner that the V-filter 242 has a pass-band of 300 kHz, for example. Note that the present disclosure is not limited to the values described above.

<<Second Embodiment>>

A video demodulation device according to a second embodiment of the present disclosure is configured and operates in the same manner as the video demodulation device 10 of the first embodiment, except the synchronization corrector 25 included in the demodulator 12.

Figure 8:
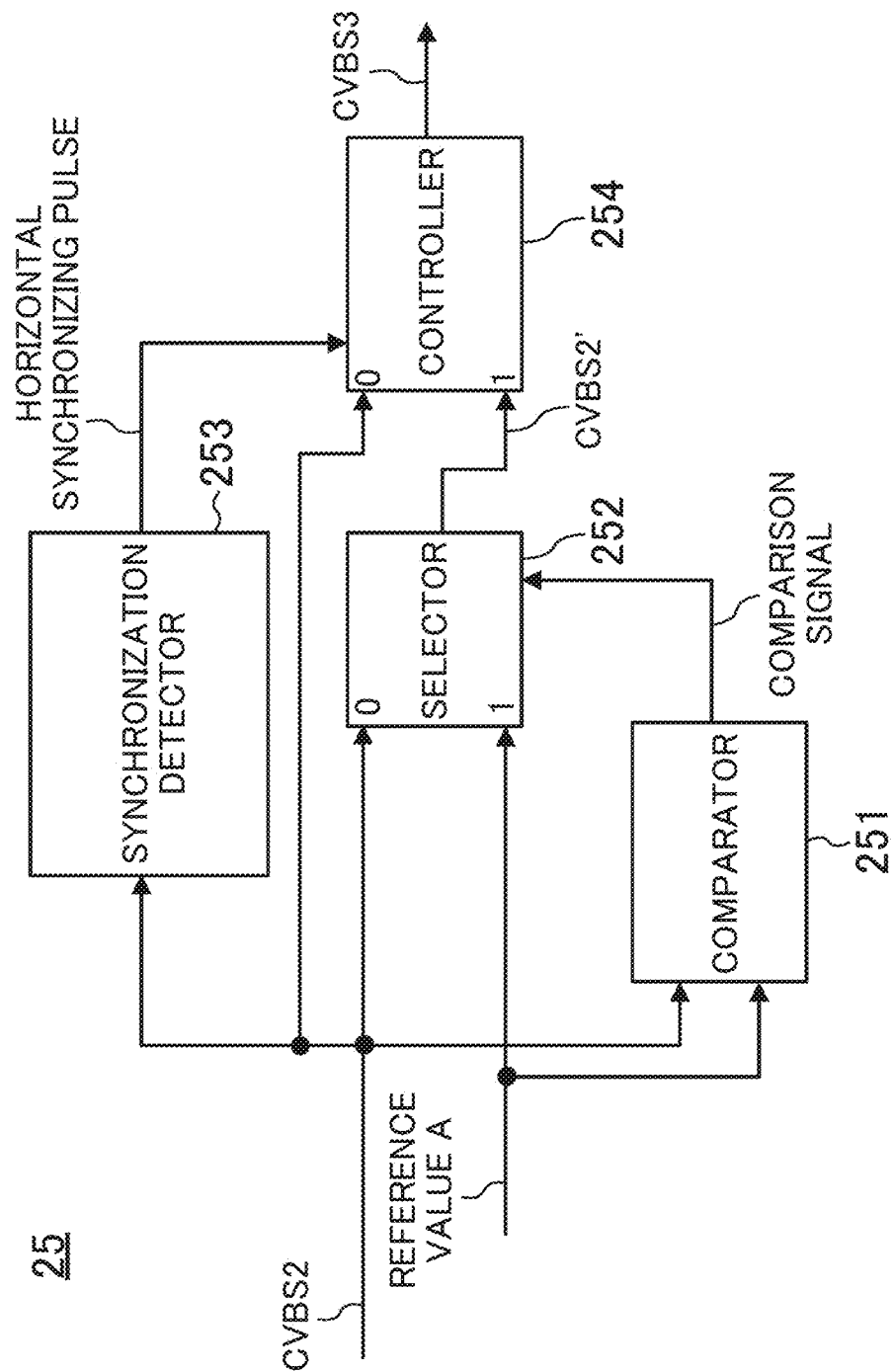
FIG. 8 is a block diagram illustrating in detail a configuration example of a synchronization corrector of a video demodulation device according to a second embodiment of the present disclosure.
Figure 9:
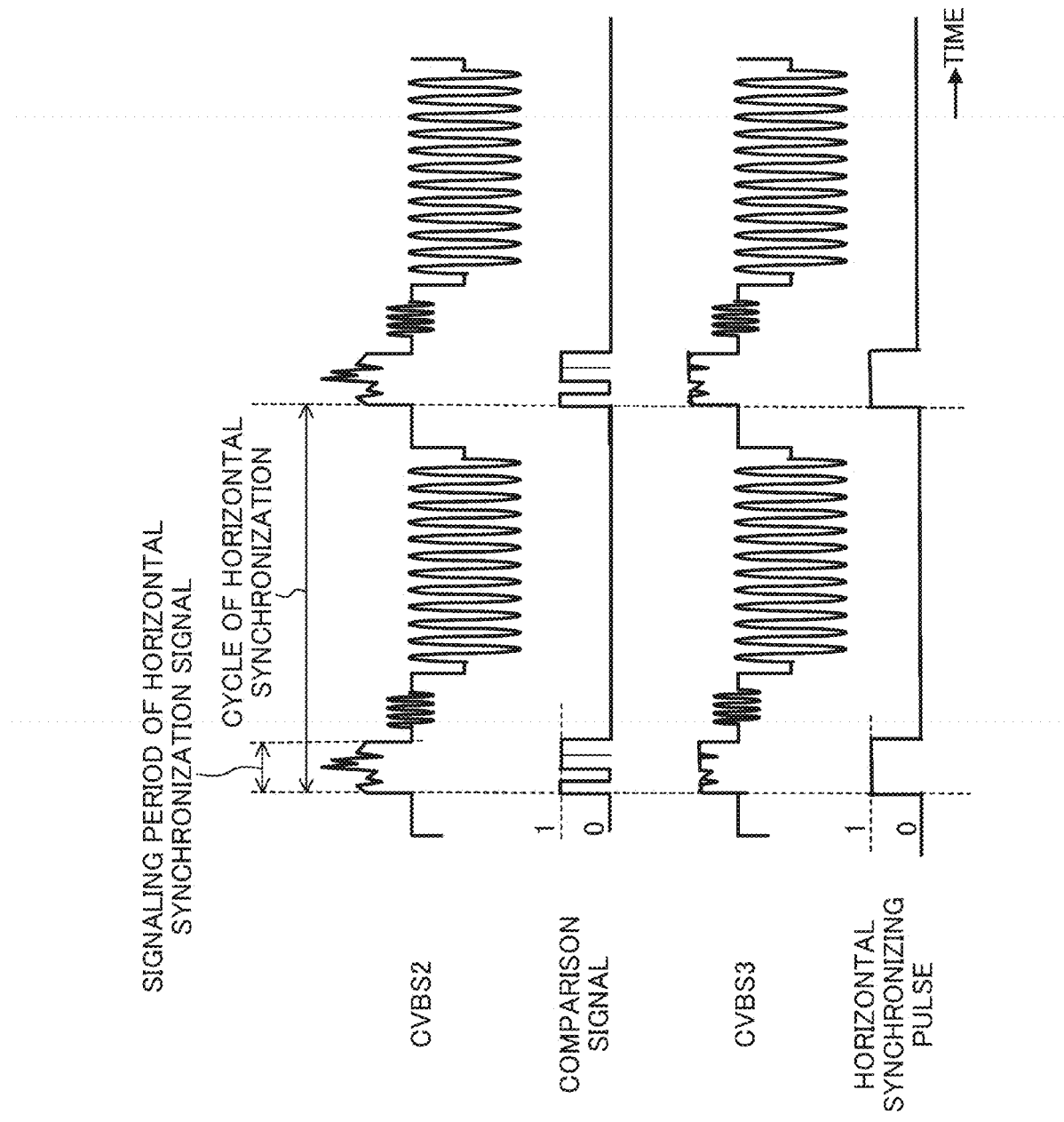
FIG. 9 is a timing chart showing operation by the synchronization corrector of FIG. 8.

FIG. 8 illustrates in detail a configuration example of the synchronization corrector 25 included in the video demodulation device 10 according to the second embodiment of the present disclosure, and FIG. 9 shows operation by the synchronization corrector 25 of FIG. 8. In FIG. 8, reference numeral 253 denotes a synchronization detector, and reference numeral 254 denotes a controller.

The comparator 251 of the synchronization corrector 25 receives, as input, a second CVBS signal (CVBS2) and a reference value A. The comparator 251 outputs, as a comparison signal, 1 when the second CVBS signal (CVBS2) is equal to or greater than the reference value A, or 0 when the second CVBS signal (CVBS2) is smaller than the reference value A. The selector 252 outputs, as a corrected second CVBS signal (CVBS2'), the reference value A when the comparison signal is 1, or the second CVBS signal (CVBS2) as it is when the comparison signal is 0. The synchronization detector 253 outputs, as a horizontal synchronizing pulse, 1 during the signaling period of the horizontal synchronizing signal of the second CVBS signal (CVBS2), or 0 during periods except the signaling period. The controller 254 outputs, as the third CVBS signal (CVBS3), the corrected second CVBS signal (CVBS2') when the horizontal synchronizing pulse is 1, or the second CVBS signal (CVBS2) when the horizontal synchronizing pulse is 0.

Thus, according to the second embodiment of the present disclosure, even when processing a signal including, e.g., a substandard color component, it is possible to correct, without causing any error, the signal by correcting the horizontal synchronizing signal only during the signaling period of the horizontal synchronizing signal.

The controller 254 may output, as the third CVBS signal (CVBS3), the reference value A when the horizontal synchronizing pulse is 1, or the second CVBS signal (CVBS2) when the horizontal synchronizing pulse is 0. The horizontal synchronizing pulse is output from the synchronization detector 253. However, another horizontal synchronizing pulse which occurs in other block such as the video processor 13 and of which delay is adjusted may be used.

<<Third Embodiment>>

A video demodulation device according to a third embodiment of the present disclosure is configured and operates in the same manner as the video demodulation device 10 of the first embodiment, except the synchronization corrector 25 included in the demodulator 12.

Figure 10:
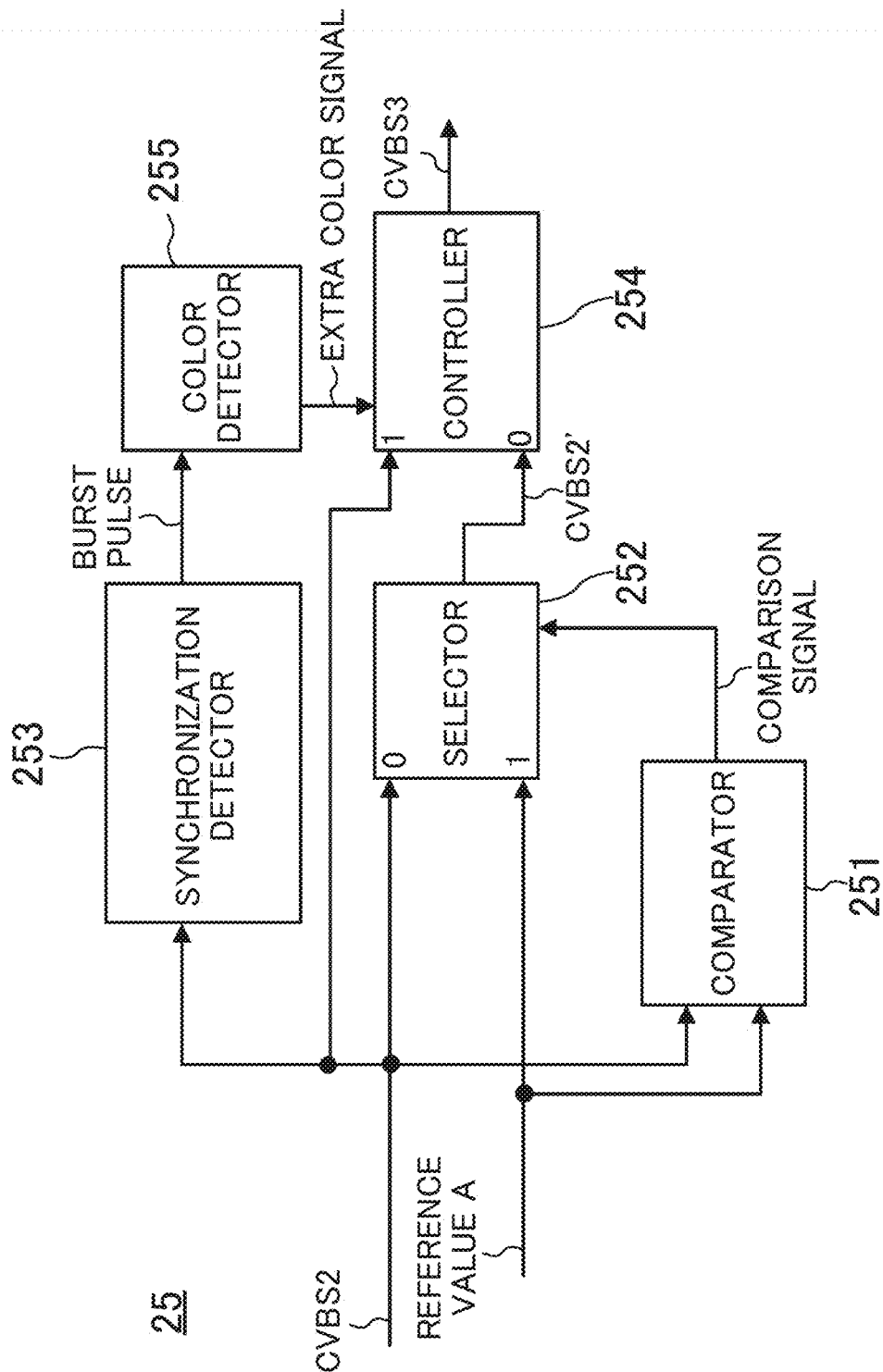
FIG. 10 is a block diagram illustrating in detail a configuration example of a synchronization corrector of a video demodulation device according to a third embodiment of the present disclosure.

FIG. 10 illustrates in detail a configuration example of the synchronization corrector 25 included in the video demodulation device 10 according to the third embodiment of the present disclosure, and FIG. 11 shows operation by the synchronization corrector 25 of FIG. 10. In FIG. 10, reference numeral 253 denotes the synchronization detector, reference numeral 254 denotes the controller, and reference numeral 255 denotes a color detector.

The comparator 251 of the synchronization corrector 25 receives, as input, a second CVBS signal (CVBS2) and a reference value A. The comparator 251 outputs, as a comparative signal, 1 when the second CVBS signal (CVBS2) is equal to or greater than the reference value A, or 0 when the second CVBS signal (CVBS2) is smaller than the reference value A. The selector 252 outputs, as a corrected second CVBS signal (CVBS2'), the reference value A when the comparison signal is 1, or the second CVBS signal (CVBS2) as it is when the comparison signal is 0. The synchronization detector 253 outputs, as a burst pulse, 1 during a burst period of the second CVBS signal (CVBS2), or 0 during periods except the bust period. In the state where the bust pulse is 1, the color detector 255 outputs, as an extra color signal, 1 when a difference B (i.e. an amplitude level of a color component) between the maximum and the minimum of the second CVBS signal (CVBS2) is equal to or greater than a predetermined value, or 0 when the difference B is smaller than the predetermined value, while renewing the extra color signal in every cycle of horizontal synchronization. The controller 254 outputs, as a third CVBS signal (CVBS3), the second CVBS signal (CVBS2) when the extra color signal is 1, or a corrected second CVBS signal (CVBS2') when the extra color signal is 1.

Thus, according to the third embodiment of the present disclosure, when a burst signal (i.e. the color component of the CVBS signal) is increased in a substandard manner due to influence of, e.g., ghosts, the synchronization corrector 25 is brought out of operation. In this manner, even when receiving a substandard signal which includes, in addition to a noise component, a signal greater than the horizontal synchronizing signal, the waveform of the substandard signal can be reproduced without making any changes.

The color detector 255 may generate the extra color signal with determining the magnitude of an output value of a bandpass filter (BPF) which extracts the frequency of the color component when the burst pulse is 1.

Figure 12B:
FIG. 12B shows an image example according to the present disclosure and with reduced lateral blurring.
Figure 12A:
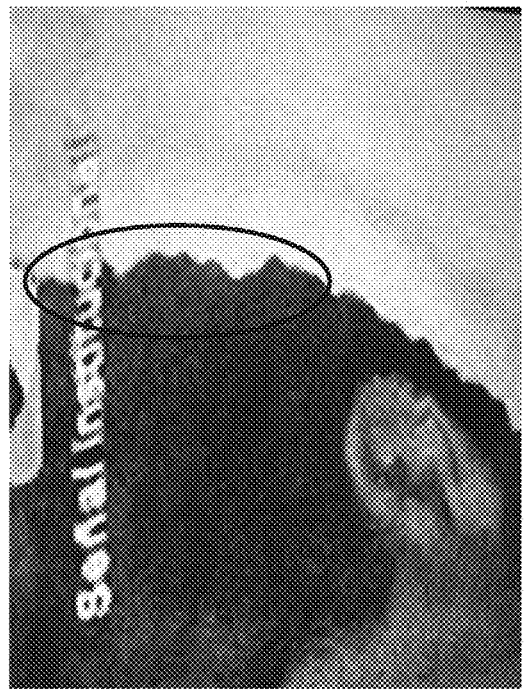

FIG. 12A shows an image example according to a conventional technique and with severe lateral blurring whereas FIG. 12B shows an image example according to the present disclosure and with reduced lateral blurring. A comparison between the portions marked with ellipses clearly demonstrates that the present disclosure advantageously reduces the lateral blurring.

As described above, even when receiving a low-quality CVBS signal, the video demodulation device of the present disclosure can advantageously and effectively remove a noise component which is included in a horizontal synchronizing signal and causes lateral burring of video. The present disclosure is useful for, e.g., video demodulation devices having a function of demodulating or reproducing a CVBS signal by digital processing.

What is claimed is:

1. A video demodulation device configured to demodulate an RF signal resulting from analog modulation of a composite video, blanking, and sync signal (a CVBS signal) including a horizontal synchronizing signal, and to reproduce the CVBS signal by digital processing, the device comprising:
a tuner configured to receive as input the RF signal resulting from analog modulation, and to output an analog IF signal; and
a demodulator configured to receive as input the analog IF signal, and to demodulate the CVBS signal,
wherein
the demodulator includes
an analog-to-digital converter configured to convert the analog IF signal into a digital IF signal,
a luminance gain adjuster configured to perform gain adjustment of a luminance component included in the digital IF signal such that a maximum of the luminance component found within a predetermined period becomes equal to a predetermined reference value, and
a synchronization corrector configured to receive as input a result of the gain adjustment, to correct a signal corresponding to a signaling period of the horizontal synchronizing signal, and to output the corrected signal as the CVBS signal, and
the synchronization corrector outputs, as the CVBS signal, a composite signal comprising the luminance component and a color component included in the gain adjustment result when the composite signal is smaller than the reference value, or the reference value when the composite signal is equal to or greater than the reference value.

2. The video demodulation device of claim 1, wherein
the synchronization corrector outputs, as the CVBS signal, the composite signal comprising the luminance component and the color component included in the gain adjustment result when the composite signal is smaller than a sum of the reference value and a preset value, or the sum of the reference value and the preset value when the composite signal is equal to or greater than the sum of the reference value and the preset value.

3. The video demodulation device of claim 1, further comprising:

a synchronization detector configured to output, as a horizontal synchronizing pulse, 1 during the signaling period of the horizontal synchronizing signal, or 0 during periods except the signaling period, wherein
in a state where the horizontal synchronizing pulse is 0, the synchronization corrector invariably outputs, as the CVBS signal, the composite signal comprising the luminance component and the color component included in the gain adjustment result, and
in a state where the horizontal synchronizing pulse is 1, the synchronization corrector outputs, as the CVBS signal, the composite signal when the composite signal is smaller than the reference value, or the reference value when the composite signal is equal to or greater than the reference value.

4. The video demodulation device of claim 1, further comprising:
a synchronization detector configured to output, as a horizontal synchronizing pulse, 1 during the signaling period of the horizontal synchronizing signal, or 0 during periods except the signaling period, wherein
the synchronization corrector outputs, as the CVBS signal, the reference value when the horizontal synchronizing pulse is 1, or the composite signal comprising the luminance component and the color component included in the gain adjustment result when the horizontal synchronizing pulse is 0.

5. The video demodulation device of claim 1, further comprising:
a color detector configured to detect an amplitude level of a color component included in the digital IF signal during a burst period, and to output, as an extra color signal, 1 when the amplitude level of the color component is equal to or greater than a predetermined value level or 0 when the amplitude level of the color component is smaller than the predetermined value level, wherein
in a state where the extra color signal is 1, the synchronization corrector invariably outputs, as the CVBS signal, the composite signal comprising the luminance component and the color component included in the gain adjustment result, and
in a state where the extra color signal is 0, the synchronization corrector outputs, as the CVBS signal, the composite signal when the composite signal is smaller than the reference value, or the reference value when the composite signal is equal to or greater than the reference value.

6. A video demodulation device configured to demodulate an RF signal resulting from analog modulation of a composite video, blanking, and sync signal (a CVBS signal) including a horizontal synchronizing signal, and to reproduce the CVBS signal by digital processing, the device comprising:
a tuner configured to receive as input the RF signal resulting from analog modulation, and to output an analog IF signal;
a demodulator configured to receive as input the analog IF signal, and to demodulate the CVBS signal, and
a video processor configured to receive as input the demodulated CVBS signal, and to output a video signal by performing required processing, wherein
the demodulator includes
an analog-to-digital converter configured to convert the analog IF signal into a digital IF signal,
an automatic phase controller configured to control and set a phase offset of a luminance component of the CVBS signal included in the digital IF signal to 0, and to output the digital IF signal as an audio/video signal,
a filter configured to separate the audio/video signal into the luminance component, a color component, and an audio component, and to output the luminance component and the color component as a first CVBS signal,
a luminance gain adjuster configured to perform gain adjustment of the luminance component included in the first CVBS signal such that a maximum of the luminance component found within a predetermined period becomes equal to a predetermined reference value, and to output the first CVBS signal as a second CVBS signal,
a synchronization corrector configured to receive as input the second CVBS signal, to correct a signal corresponding to a signaling period of the horizontal synchronizing signal, and to output the second CVBS signal as a third CVBS signal,
a clamp circuit configured to perform polarity inversion of the third CVBS signal, to adjust the third CVBS signal so as to be at a predetermined DC level, and to output the third CVBS signal as the CVBS signal, and
a digital-to-analog converter configured to convert the CVBS signal having been input from the clamp circuit into an analog signal, and to output the analog signal to the video processor, and
the synchronization corrector outputs, as the third CVBS signal, the second CVBS signal when the second CVBS signal is smaller than the reference value, or the reference value when the second CVBS signal is equal to or greater than the reference value.

7. A receiver comprising:
the video demodulation device of claim 1; and
an antenna configured to supply the RF signal resulting from analog demodulation to the tuner.

8. A receiver comprising:
the video demodulation device of claim 6; and
an antenna configured to supply the RF signal resulting from analog demodulation to the tuner.

* * * * *